UNITED STATES PATENT OFFICE.

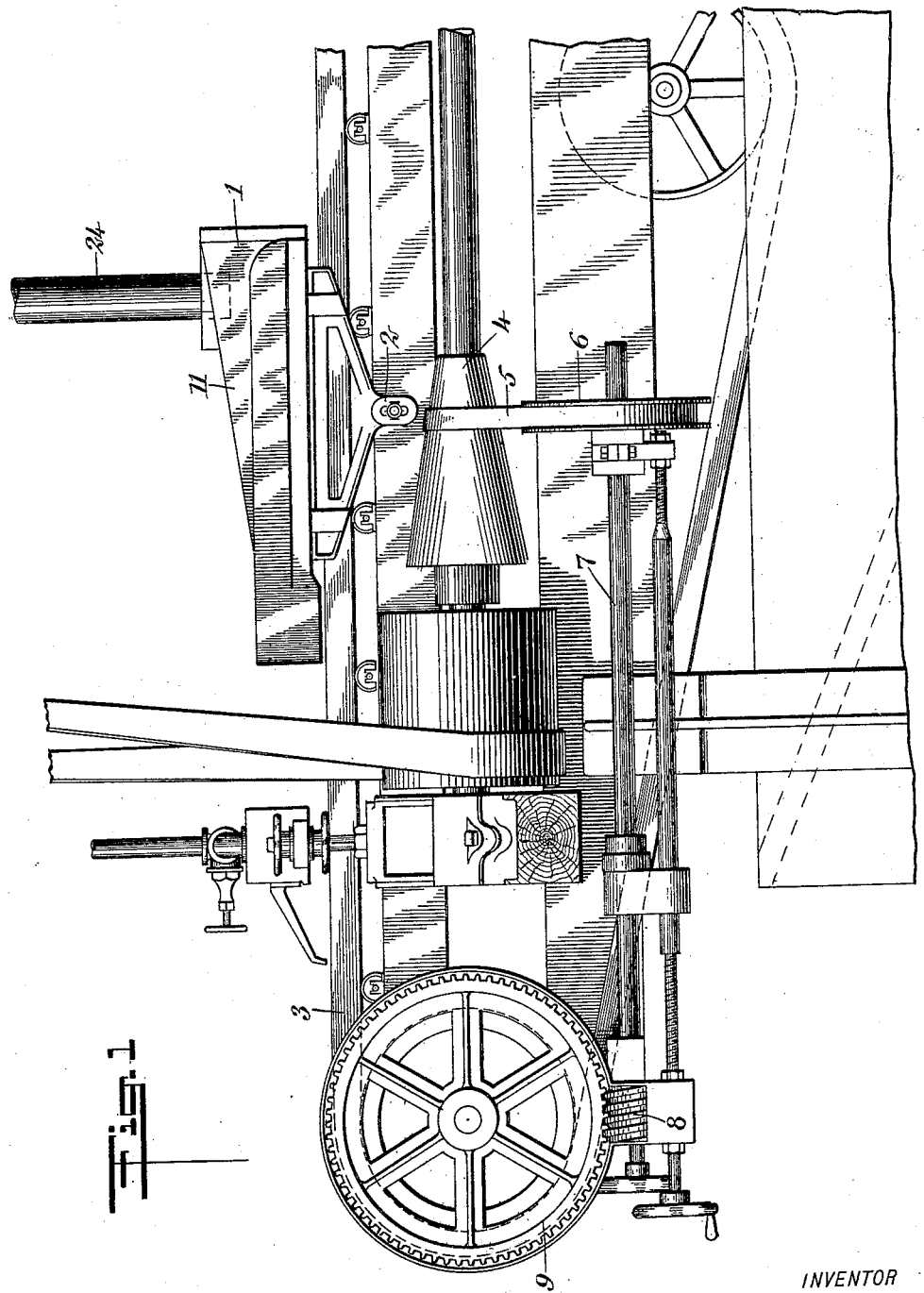

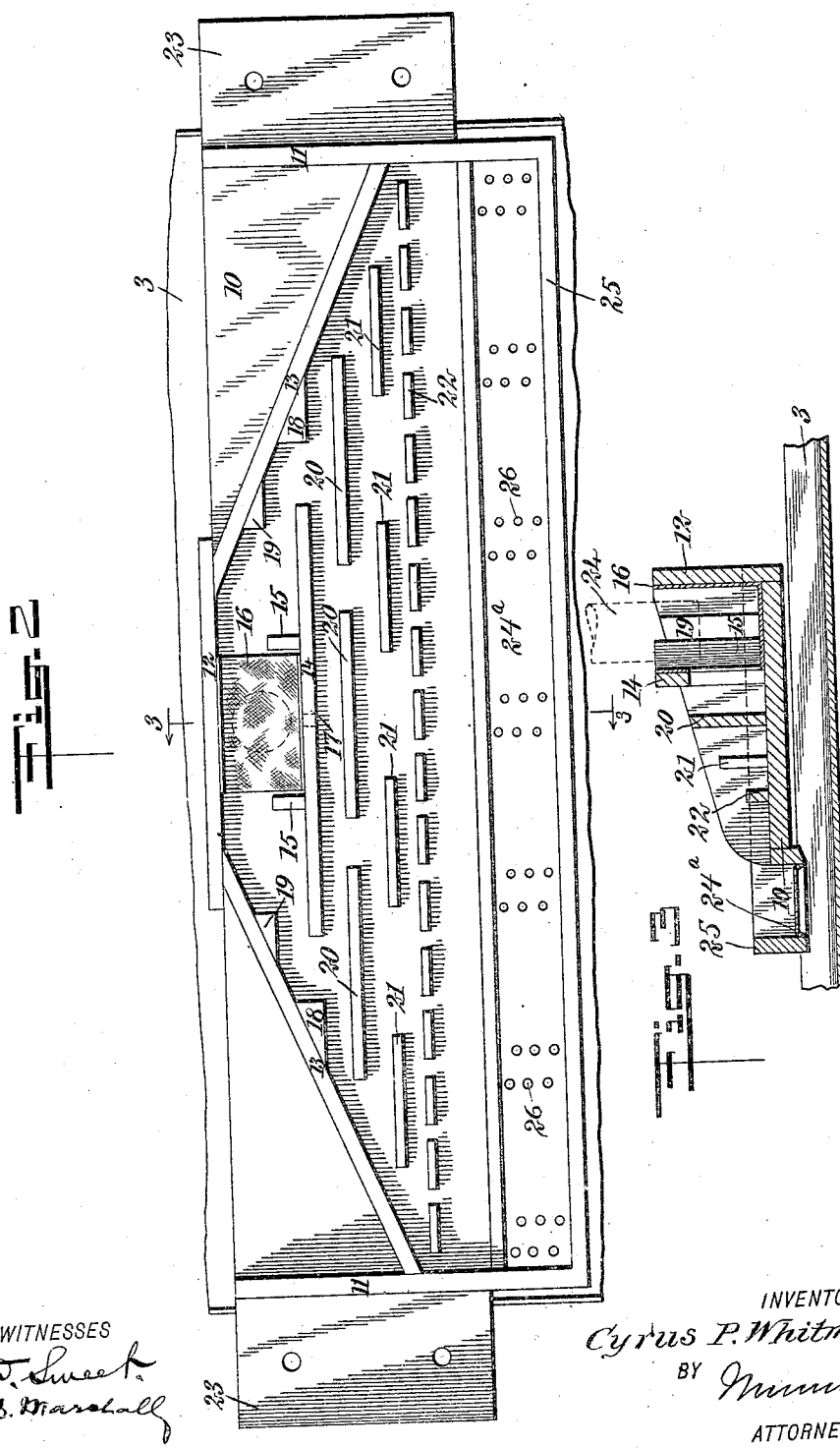

CYRUS P. WHITMORE, OF SALT LAKE CITY, UTAH.

FEED-DISTRIBUTER FOR VANNERS.

No. 914,096.      Specification of Letters Patent.      Patented March 2, 1909.

Application filed July 3, 1908. Serial No. 441,903.

*To all whom it may concern:*

Be it known that I, CYRUS P. WHITMORE, a citizen of the United States, and a resident of Salt Lake City, in the county of Salt Lake and State of Utah, have invented a new and Improved Feed-Distributer for Vanners, of which the following is a full, clear, and exact description.

My invention has for its object to provide a feed distributer for vanners of the Frue or other similar type, and it is adapted to be disposed transversely over the conveyer, there being side rails on the feed distributer and a rear central member with obliquely disposed members connecting the rear member with the side rails. Guide members are also provided which are disposed at right-angles to the side rails, there being a slot in the rear guide member, behind which the material is introduced. Buffers are provided, which are adapted to direct the material in front of the rear guide member, there being rows of guide members in front of the rear guide member, which are adapted to assist in the distribution of the material, which will flow to and through the feeder openings in the front of the device, these openings being relatively small and close together. An extension to the floor of the device with holes therein, is provided when slimes are being treated.

In this specification I will describe the preferred form of my invention, but I do not limit myself thereto, as it is understood that I consider myself entitled to all forms and embodiments of the invention which may be held to fall within the scope of the appended claims.

Reference is to be had to the accompanying drawings, forming a part of this specification, in which similar characters of reference indicate corresponding parts in all the views, in which—

Figure 1 is an elevation showing my improved feed distributer as applied to a vanner of the Frue type; Fig. 2 is an enlarged plan view of my feed distributer; and Fig. 3 is a sectional view on the line 3—3 of Fig. 2.

By referring to Fig. 1, it will be seen that my feed distributer 1, is adjusted to a Frue vanner by the usual means 2, which will permit of the feed distributer being inclined at a desired angle, and which will also permit of its being lifted and lowered slightly with reference to the vanner. The vanner with the conveyer 3, cone pulley 4, belt 5, pulley 6, shaft 7, the worm 8 and the gear wheel 9 as well as the other parts shown in Fig. 1 of the drawings, are of the usual type and construction familiar to those acquainted with the art, and need not be described in this specification as my invention relates merely to the feed distributer 1, which is best shown in Figs. 2 and 3.

The feeder consists of a floor 10 with side rails 11, the rear central member 12 being disposed at right-angles to the side rails 11 and being preferably secured against the rear of the floor 10, as shown in Figs. 2 and 3 of the drawings. The rear central member 12 is connected with the side rails 11 by obliquely disposed members 13. A rear guide member 14 is secured to the floor 10 and is disposed at right-angles to the side rails 11 and between the obliquely disposed members 13, but the said rear guide member 14 does not extend to the said obliquely disposed members. Buffers 15 are disposed on the rear face of the said rear guide member 14, and in the space between the said buffers 15 and the rear central member 12, and the rear guide member 14, is disposed a wearing material 16, on which the pulverized ore is deposited. In the rear guide member 14 there is a slot 17, and buffers 18 are secured to the obliquely disposed members, the said buffers being substantially in alinement with the rear guide member. Still a second set of buffers 19 are secured to the obliquely disposed members 13, this second set of buffers 19 being disposed behind the rear guide member 14. In front of the rear guide member 14 is disposed a row of guide members 20, the end members not extending to the obliquely disposed members 13, but being disposed in front of the opening between the buffers 18 and the ends of the rear guide member 14. I preferably use three members on this row of guide members 20, the openings between the central members and the side members being some little distance inside of the ends of the rear guide member 14. A second row of guide members 21 is disposed in front of the first row of guide members 20, the members 21 being preferably four in number and being disposed in front of the openings between the end guide members 20 and the obliquely disposed members 13, and also between the central and side guide members 20. In front of this second row of guide members 21 are disposed the feeder members 22, which are relatively numerous and short, with small openings therebetween. As shown in Fig. 3, I prefer to taper the central guide member, the first row of guide members 20, the second row of guide members 21 and the feeder members 22, so that they will be relatively higher in the rear of the device and decrease in height toward the front. Ears 23 are secured to the sides of the feed distributer, to permit of its adjustment, as shown in Fig. 2 of the drawings. When fine ores, known as slimes, are being treated, an extension 24$^a$ to the floor of the distributer is used, this extension being secured to the floor of the distributer and having a rail 25 which may be a continuation of the side rails 10. There are orifices 26 in the floor of the extension 24$^a$, through which the slime may flow.

In using my invention, the pulverized ore is deposited from a pipe 24 on the wearing material 16, from whence some of it flows through the small slot 17, but the bulk of it flows back of the buffers 15 and it contacts with the buffers 19 and 18, which tend to converge the streams flowing around the rear guide member 14, so that the bulk of it will flow between the central and side members of the first row of guide members 20, though some of it will flow between the said members 20 and the obliquely disposed members 13. As the material passes in front of the first row of guide members 20, it strikes the second row of guide members 21 which are relatively shorter in length, from whence it passes through the openings between the feeder members 22 and off of the feed distributer on to the conveyer 3. When the extension 24$^a$ is used, the slime will pass from the feeder members 22 to the extension 24$^a$ and will flow through the orifices 26.

Having thus described my invention, I claim as new and desire to secure by Letters Patent:

1. A feed distributer for vanners consisting of a floor, side rails, a rear central member substantially at right-angles to the side rails, obliquely disposed members connecting the rear central member with the side rails, a rear guide member which is disposed between the obliquely disposed members but which does not extend thereto, and buffers disposed laterally of the rear guide member, which are adapted to converge the streams of pulverized ore which flow around the ends of the rear guide member.

2. A feed distributer for vanners consisting of a floor, side rails, a rear central member substantially at right-angles to the side rails, obliquely disposed members connecting the rear central member with the side rails, a rear guide member which is disposed between the obliquely disposed members but which does not extend thereto, there being a slot in the said rear guide member, and buffers disposed laterally of the rear guide member which are adapted to converge the streams of pulverized ore which flow around the ends of the rear guide member.

3. A feed distributer for vanners consisting of a floor, side rails, a rear central member substantially at right-angles to the side rails, obliquely disposed members connecting the rear central member with the side rails, a rear guide member which is disposed between the obliquely disposed members, but which does not extend thereto, buffers disposed laterally of the rear guide member, which are adapted to converge the streams of pulverized ore which flow around the ends of the rear guide member, and a series of guide members which are parallel and which are disposed in front of the rear guide member, the openings between the guide members being out of alinement and the guide members in front being shorter in length than those in the rear.

4. A feed distributer for vanners consisting of a floor, side rails, a rear central member substantially at right-angles to the side rails, a rear guide member which is disposed in front of the rear central member, buffers disposed laterally of the rear guide member which are adapted to converge the streams of pulverized ore which flow around the ends of the rear guide member, and buffers on the rear face of the rear guide member between which the pulverized ore may be dumped.

5. A feed distributer for vanners consisting of a floor, side rails, a rear central member substantially at right-angles to the side rails, a rear guide member which is disposed in front of the rear central member, buffers disposed laterally of the rear guide member which are adapted to converge the streams of pulverized ore which flow around the ends of the rear guide member, and buffers on the rear face of the rear guide member between which the pulverized ore may be dumped, there being a slot in the rear guide member between the buffers on its rear face.

6. A feed distributer for vanners consisting of a floor, side rails, a rear central member substantially at right-angles to the side rails, obliquely disposed members connecting the rear central member with the side rails, a rear guide member which is disposed between the obliquely disposed members but which does not extend thereto, buffers disposed laterally of the rear guide member which are adapted to converge the streams of pulverized ore which flow around the ends of the rear guide member, buffers on the rear face of the rear guide member between which the pulverized ore may be dumped, a series of guide members which are parallel and which are disposed in front of the rear guide member, the openings between the guide members being out of alinement, and a floor in front of the guide members, the floor having orifices therein through which the pulverized ore may flow.

In testimony whereof I have signed my name to this specification in the presence of two subscribing witnesses.

CYRUS P. WHITMORE.

Witnesses:
    JOHN ROBERTSON,
    HENRY S. HICKS.